United States Patent [19] [11] Patent Number: 6,023,302
MacInnis et al. [45] Date of Patent: Feb. 8, 2000

[54] BLENDING OF VIDEO IMAGES IN A HOME COMMUNICATIONS TERMINAL

[75] Inventors: Alexander G. MacInnis, San Carlos; Jiann-Tsuen Chen, Cupertino, both of Calif.

[73] Assignee: PowerTV, Inc., Cupertino, Calif.

[21] Appl. No.: 08/612,162

[22] Filed: Mar. 7, 1996

[51] Int. Cl.[7] .................................................. H04N 9/74
[52] U.S. Cl. ........................ 348/597; 348/590; 348/592; 348/586
[58] Field of Search .................................. 348/586, 587, 348/590, 591, 592, 593, 594, 595, 597, 598, 599; H04N 9/74

[56] References Cited

U.S. PATENT DOCUMENTS

| | | |
|---|---|---|
| 4,319,266 | 3/1982 | Bannister . |
| 4,694,490 | 9/1987 | Harvey et al. . |
| 4,704,725 | 11/1987 | Harvey et al. . |
| 4,758,893 | 7/1988 | Lippel ........................................ 348/574 |
| 4,947,240 | 8/1990 | Hausdorfer ............................... 348/595 |
| 4,965,825 | 10/1990 | Harvey et al. . |
| 5,070,397 | 12/1991 | Wedderburn-Bisshop .............. 348/591 |
| 5,109,414 | 4/1992 | Harvey et al. . |
| 5,185,808 | 2/1993 | Cok . |
| 5,185,856 | 2/1993 | Alcorn et al. . |
| 5,233,654 | 8/1993 | Harvey et al. . |
| 5,282,037 | 1/1994 | Eguchi et al. ............................ 348/595 |
| 5,335,277 | 8/1994 | Harvey et al. . |
| 5,355,175 | 10/1994 | Okada et al. ............................ 348/595 |
| 5,363,475 | 11/1994 | Baker et al. . |
| 5,367,632 | 11/1994 | Bowen et al. . |
| 5,384,912 | 1/1995 | Orgrinc et al. . |
| 5,394,523 | 2/1995 | Harris . |
| 5,398,297 | 3/1995 | Clark et al. . |
| 5,409,379 | 4/1995 | Montag et al. . |
| 5,592,236 | 1/1997 | Rosenbaum et al. . |

OTHER PUBLICATIONS

"Representing Moving Images with Layers", by John Y.A. Wang and Edward H. Adelson, IEEE Transactions on Image Processing, vol. 3, No. 5, Sep. 1994.

"Transparency and Antialising Algorithms Implemented with the Virtual Pixel Maps Technique", by Abraham Mammen, IEEE Computer Graphics & Applications, Jul. 1989.

"Compositing, Part 1: Theory", by James F. Blinn, IEEE Computer Graphics & Applications, Sep. 1994.

Primary Examiner—Michael H. Lee
Attorney, Agent, or Firm—Kenneth M. Massaroni; Hubert J. Barnhardt III; Kelly A. Gardner

[57] ABSTRACT

A graphics blending feature for a terminal such as a home communication terminal (HCT) allows an overlay image to be selectively blended with a background image through the use of a chroma key function and one or more alpha control bits. The chroma key function is used to determine whether the overlay will be completely transparent or not, and the one or more alpha control bits are used to look up a larger alpha value used to blend the overlay and background images. By using a small number of alpha control bits to retrieve a larger alpha value for blending, memory requirements per pixel are reduced. The chroma key function may be implemented by comparing each overlay pixel value to a chroma value and, responsive to a match, making the overlay pixel transparent (i.e., no blending occurs). A dithering function is included in various embodiments to smooth out the resulting image.

13 Claims, 12 Drawing Sheets

BLENDING OF VIDEO IMAGES IN A HOME COMMUNICATIONS TERMINAL

RELATED APPLICATIONS

This application is related in subject matter to the following copending, commonly owned applications filed concurrently herewith: "List Controlled Video Operations", Ser. No. 08/612,104, and "Interpolation of Pixel Values and Alpha Values in a Computer Graphics Display Device", Ser. No. 08/612,105, each of which is incorporated by reference herein.

BACKGROUND OF THE INVENTION

1. Technical Field

This invention relates generally to methods of blending and otherwise manipulating video images in a terminal such as a home communications terminal (HCT) in a cable television system. More particularly, the invention provides various features which improve the efficiency and capabilities of computer graphics in such a terminal.

2. Related Information

Conventional image processing techniques in terminals, such as those in cable television systems, have typically provided limited capabilities tailored to displaying simple information on the television screen such as menus and basic video overlays. As growth in the cable television industry has fostered new features including interactive video games, graphically intensive news shows, multimedia applications and the like, there has evolved a need to provide new and higher performance graphics capabilities on the terminals.

Additionally, newer generations of fiber-based networks have vastly increased the data bandwidths which can be transferred to and from individual homes, allowing entirely new uses to be developed for the terminals. As a result, conventional terminals and their graphical systems are quickly becoming obsolete. In short, terminals such as HCTs need to evolve to transform today's limited capability television sets into interactive multimedia entertainment and communication centers.

Conventional graphics display systems often include the ability to overlay an image onto background video. For example, sports scores may be superimposed at the bottom of a moving image of a football game. In such systems, each pixel can be rendered in one of three ways: opaque (each pixel takes on the value of the overlaid image only); translucent (the overlaid image and background image are be blended so that the background image can be "seen through" the overlay); or transparent (only the background image is displayed).

Figure 1A:
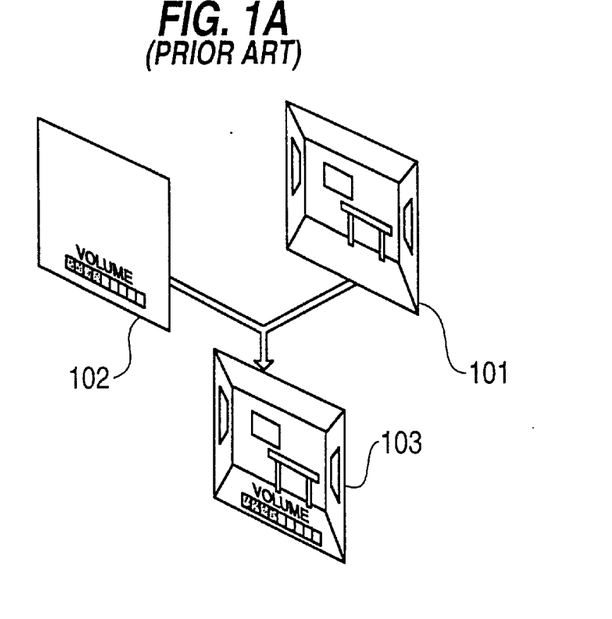
FIG. 1A shows a conventional method of combining an overlay image with a background video image to produce a blended image.

As another example, a graphical control object such as a volume control indicator may be superimposed over a live video image on a television display. As shown in FIG. 1A, for example, a live video image 101 may be combined with a volume control indicator 102 in such a manner that the resulting image 103 includes both images—i.e., the user can see two layers of screen images: the live video that was visible before the overlay, and the overlaid image itself.

In order to control the amount of blending in the aforementioned examples, conventional systems typically implement transparency by allocating a plurality of additional bits for each pixel which indicate the degree to which the pixels from the overlay and background will be blended. For example, a group of such "blending" bits for each pixel can be used as a value which is multiplied with the overlay pixel value before being combined with the background image, thus controlling whether the overlay portion or the background image will dominate the resultant image.

Figure 1B:
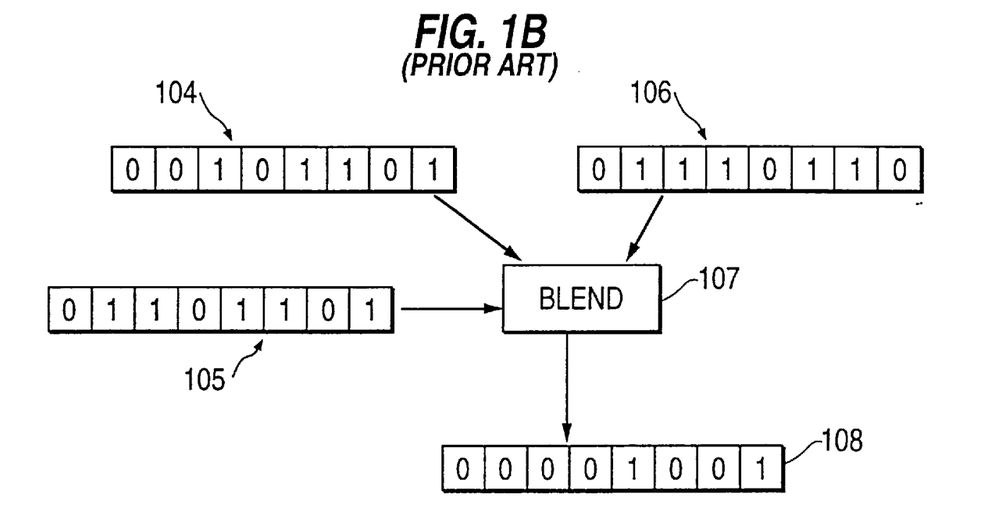
FIG. 1B shows a conventional technique for blending pixels using a blending value 105 associated with each pixel.

As shown in FIG. 1B, for example, each pixel value 104 in the overlay image 102 may have associated therewith a "blending" factor 105 (comprising a plurality of pixels) which is multiplied by the overlay pixel value in order to blend the overlay with a corresponding background image pixel 106 to produce a resultant pixel 108. These operations can be used to produce a blended image such as image 103 of FIG. 1A.

A conventional formula used to blend a foreground image and a background image for each pixel of a display is given by the following equation:

$$\alpha*(\text{foreground pixel value})+(1-\alpha)*(\text{background pixel value}),$$

where $\alpha$ represents the blending value associated with each pixel in the foreground (overlay) image and "*" indicates multiplication. Commonly, for a red-green-blue (RGB) pixel value comprising 16 bits (5 red, 6 green, 5 blue), each color component is separately blended to produce the resultant image.

Unfortunately, adding a group of bits 105 as a blending factor to each overlay pixel increases the memory and processing requirements for manipulating the images. Thus, it may be necessary to provide wider memory interface buses, wider registers in the system to manipulate pixel values, and to add memory. In an HCT in which cost is a major concern, assigning additional bits for every pixel to implement transparency increases the memory requirements and processing needed to render each image frame. Accordingly, conventional approaches for implementing transparency may be too expensive to implement in a low-cost HCT.

Figure 1C:
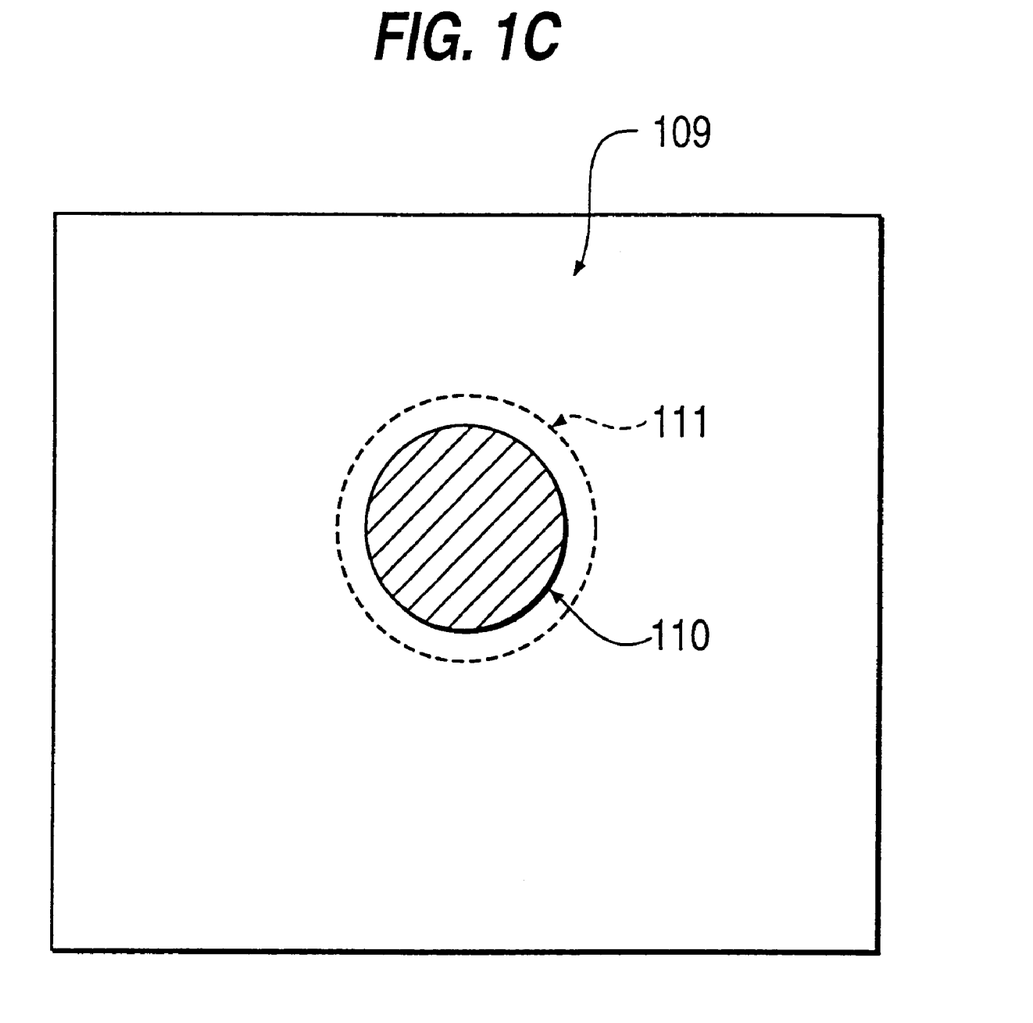
FIG. 1C shows how a blending zone 111 can be used to "soften" an opaque overlay 110 on a background image 109.

It may also be desirable to blend two images in a spatially controlled manner, in order to "soften" sharp edges around an otherwise opaque overlaid portion of an image. For example, as shown in FIG. 1C, if an opaque circle 110 is to be displayed on a background image 109, the edges of the circle will create a sharp contrast to the background if the corresponding pixel values of the overlay and background are far apart. This effect can be mitigated by creating a "buffer" zone 111 around the overlay image 110, and blending pixel values within the buffer zone according to the same general principles shown in FIG. 1B. However, as described previously, it is usually necessary to associate a plurality of blending bits with each pixel value in the overlay image, thus increasing memory and processing requirements.

SUMMARY OF THE INVENTION

The present invention solves the aforementioned problems by providing graphical blending features using a low-cost approach. More particularly, the present invention contemplates providing an image blending feature which implements transparency by assigning a single bit ("alpha control bit") to each pixel in an overlaid image which determines whether that pixel is translucent or not, and using a single "alpha value" for the entire overlay which defines the degree of blending which will be provided for that pixel. Thus, instead of assigning a blending value for each pixel, a single bit can be used, while still retaining the ability to set the degree of blending using a predetermined alpha value for the overlay. This technique significantly reduces the memory and processing requirements for the image processing while still providing a flexible graphics blending function.

In various other embodiments, the invention also contemplates associating with each pixel in the overlay image a "chroma key" function which determines the transparency of each pixel by examining the pixel value itself. If a pixel is indicated as being opaque, then no blending using the alpha value occurs for that pixel; the value of the overlaid pixel will be directly displayed and not combined with the background image. The alpha control bit and chroma key function can be combined to perform various types of image manipulation using a minimum of memory and processing resources in each terminal, thus reducing costs.

A chroma key value or a range of values can be established for the purpose of determining whether any particular overlay pixel will be translucent. Each pixel value is compared to the chroma key value (or range) and, if the pixel value matches the chroma key value (or falls within its range) it will be deemed to be translucent and thus blended with the background image.

Yet another aspect of the present invention involves dithering. Conventional dithering provides for truncation of pixel values using a special pixel pattern in order to "soften" what would otherwise be "hard" edges caused by simple bit truncation. The present invention contemplates expanding this technique to perform dithering on pixel values which have been blended in accordance with a chroma key function and alpha control bit.

Other features and advantages of the invention will become apparent through the following detailed description, drawings, and the appended claims.

DETAILED DESCRIPTION OF THE PREFERRED EMBODIMENTS

Figure 2:
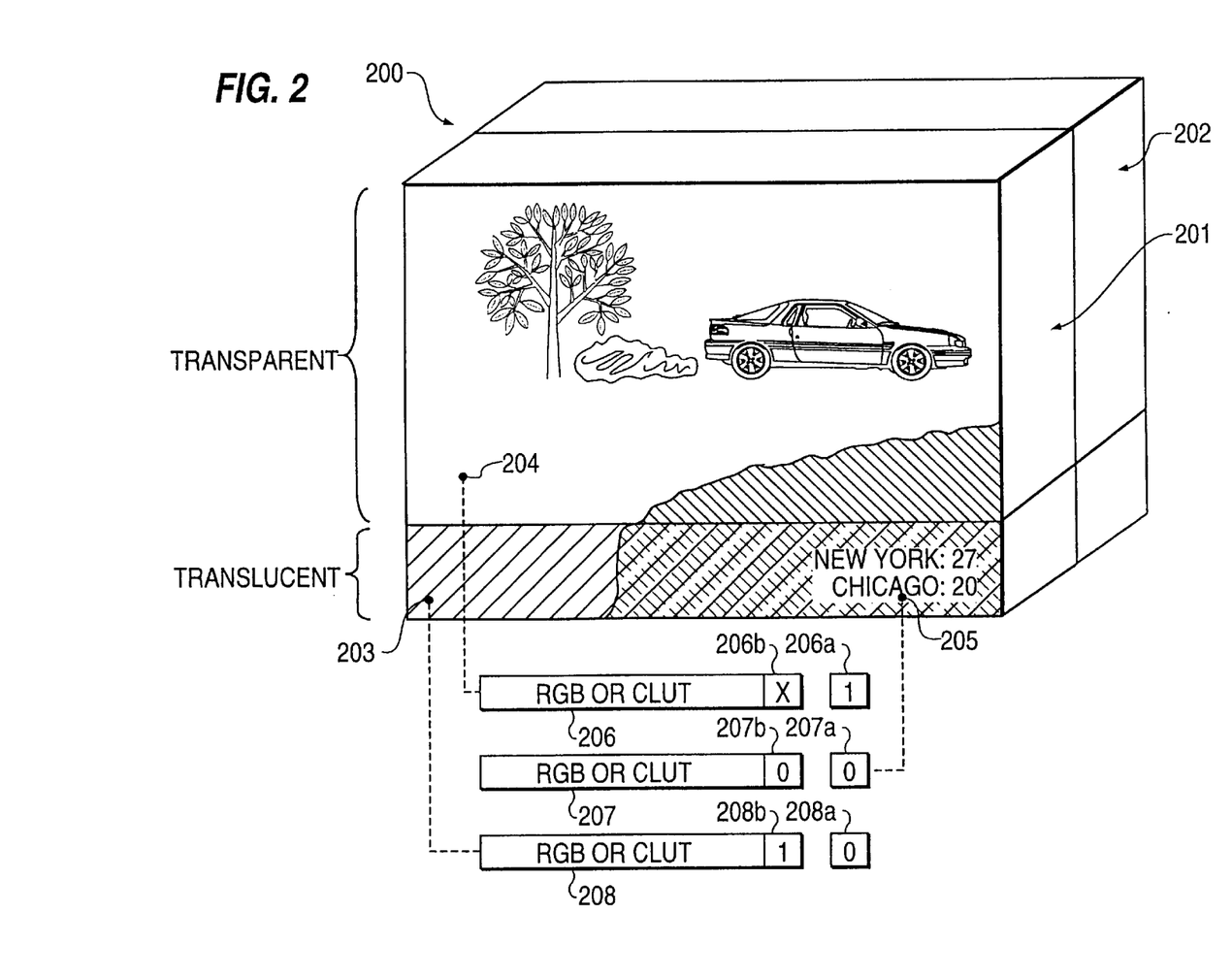
FIG. 2 shows how a transparency bit 206a and an alpha control bit 206b can be used to control the blending of an overlay image 201 with a background image 202.

FIG. 2 shows a group of pixels 200 stored in a memory, comprising a background portion 202 and an overlay portion 201. The background portion 202 may comprise live video or another type of image, wherein each pixel comprises 8, 16, or 24 bits, for example (the number of bits per pixel may vary depending on the application). The overlay portion 201 may comprise 8, 16, or 24 bits comprising graphical information generated by an application program, for example.

In accordance with various aspects of the invention, a viewer may see three different types of pixel values on a display corresponding to pixel values 200: (1) a "transparent" pixel 204, corresponding to the background image only; (2) an "opaque" pixel 205, corresponding to the overlay image only (i.e., obliterating the background image); or (3) a "translucent" pixel 203, corresponding to a blending between the background image and the overlay (or "foreground") image. Thus, for example, the overlay image may comprise a light blue band across the bottom of the screen (i.e., pixel 203) with superimposed opaque sports scores (i.e., pixel 205).

In various embodiments, the display depicted in FIG. 2 may be implemented by using overlay pixels having associated therewith a chroma key function (206a, 207a, and 208a, which may alternatively be implemented with a "transparency bit") and an alpha control bit (206b, 207b, and 208b). Each overlay pixel (206, 207 and 208) may comprise an RGB (red-green-blue) or CLUT (color look-up table) encoded value, as is well known in the art. The chroma key function and alpha control bits, however, operate in conjunction with a predetermined alpha value (not shown) to control the blending of background image 202 and overlay image 201. Thus, only a single bit (alpha control) needs to be added to each pixel to control the amount of blending. By using a predetermined alpha value which can be modified by an application program, the ability to provide a wide range of blending values is maintained.

Instead of providing a single alpha control bit, a plurality of alpha control bits (e.g., 2, 3, or 4) could instead be used to control the amount of blending. However, in contrast to the conventional method shown in FIG. 1B, such bits are used to encode references to one or more alpha values which are then used to control the amount of blending. For example, if two alpha control bits are associated with each pixel value, then a value of 00 could indicate that no blending should occur; a value of 01 could indicate that a first alpha value should be used for the blending; a value of 10 could indicate that a second alpha value should be used for the blending; and a value of 11 could indicate that a third alpha value should used for the blending.

Alternatively, a single alpha value could be assigned, and a control bit value of 01 could indicate that 0.25 times the alpha value should be used; a value of 10 could indicate that 0.5 times the alpha value should be used; and a value of 11 could indicate that 1.0 times the alpha value should be used. Other variations are of course possible; one of ordinary skill in the art will recognize that the use of a smaller number of bits to perform blending of larger values using any of the aforementioned variations results in a large reduction in memory needed to store complex video images. Further explanation of these techniques is provided below with reference to FIGS. 3D, 3E and 3F.

The operation of the chroma key function and alpha control bit can be summarized as follows. The chroma key function and alpha control bit associated with each overlay pixel are tested prior to display of each pixel to determine whether the background value, overlay value, or a blended value should be displayed. If the chroma key function is set (as indicated by bit 206a in FIG. 2), then the overlay pixel is deemed to be completely transparent, and only the background image is displayed. Thus, all overlay pixels in the overlay portion 201 located above the horizontal band shown in FIG. 2 would have this bit set by an application program which was displaying graphics on the background image. In this case, the value of the alpha control bit 206b is irrelevant, indicated by "X" for "don't care". In other words, setting the chroma key function for an overlay pixel causes only the background image to be displayed.

Conversely, if the chroma key function is not set, such as bits 207a and 208a shown in FIG. 2, then a further test is made to determine whether the alpha control bit is set for the overlay pixel. If, as depicted in pixel 207, the alpha control bit 207b is not set, then the overlay pixel is deemed to be opaque, and only the value of the overlay pixel (i.e., the remaining bits in pixel 207) are displayed, and the corresponding background pixel (in portion 202) is not displayed. Thus, for example, sports scores, time, or the like can be displayed as shown by pixel 205 in FIG. 2, and the background image corresponding to that pixel is not seen.

Finally, if the chroma key function is not set (indicating that the alpha control bit will be examined) and the alpha control bit is set (i.e., bit 208b in FIG. 2), then the value of the background image pixel is blended with the value of the overlay image pixel using an alpha value (not shown), and the blended result is displayed. These pixels are referred to as "translucent", and as shown in FIG. 2 this type of blending can be used for example to present a hazy band of color across the bottom of the displayed image, wherein the background image can be faintly seen through the color (see pixel 203). The degree of blending and thus "faintness" is controlled by the alpha value. Thus, the user can see both the overlay and background images simultaneously, and an application program can determine which portions of the display will be translucent to the viewer. Each chroma keying value (206a, 207a and 208a) is shown separately from each pixel value, because in accordance with various embodiments, the chroma keying value is determined based on the overlay pixel value itself and not by allocating a separate bit in memory. However, a separate bit in memory could be allocated to implement a chroma keying function.

As is conventional, each pixel value can correspond to red-green-blue (RGB) values or CLUT (color look-up table) values. For RGB pixel types, blending of the overlay and background pixels is preferably done by independently blending each color component (red, green, and blue) prior to display. The following conventional formula can be used to blend each background pixel with the overlay using a predetermined alpha value for translucent pixels:

$$\text{output pixel} = \alpha * (\text{overlay pixel value}) + (1-\alpha) * (\text{background pixel value}),$$

where $\alpha$ is an alpha value which can be set or modified by the application program.

The display scheme shown in FIG. 2 can also be used to perform boundary smoothing as described with reference to FIG. 1C. Thus, an application program can selectively control which areas of the displayable image will be blended, without requiring a large number of extra bits to be associated with each pixel value. The application program can set the alpha value and can change the value while the image is being displayed to achieve special effects.

Figure 3A:
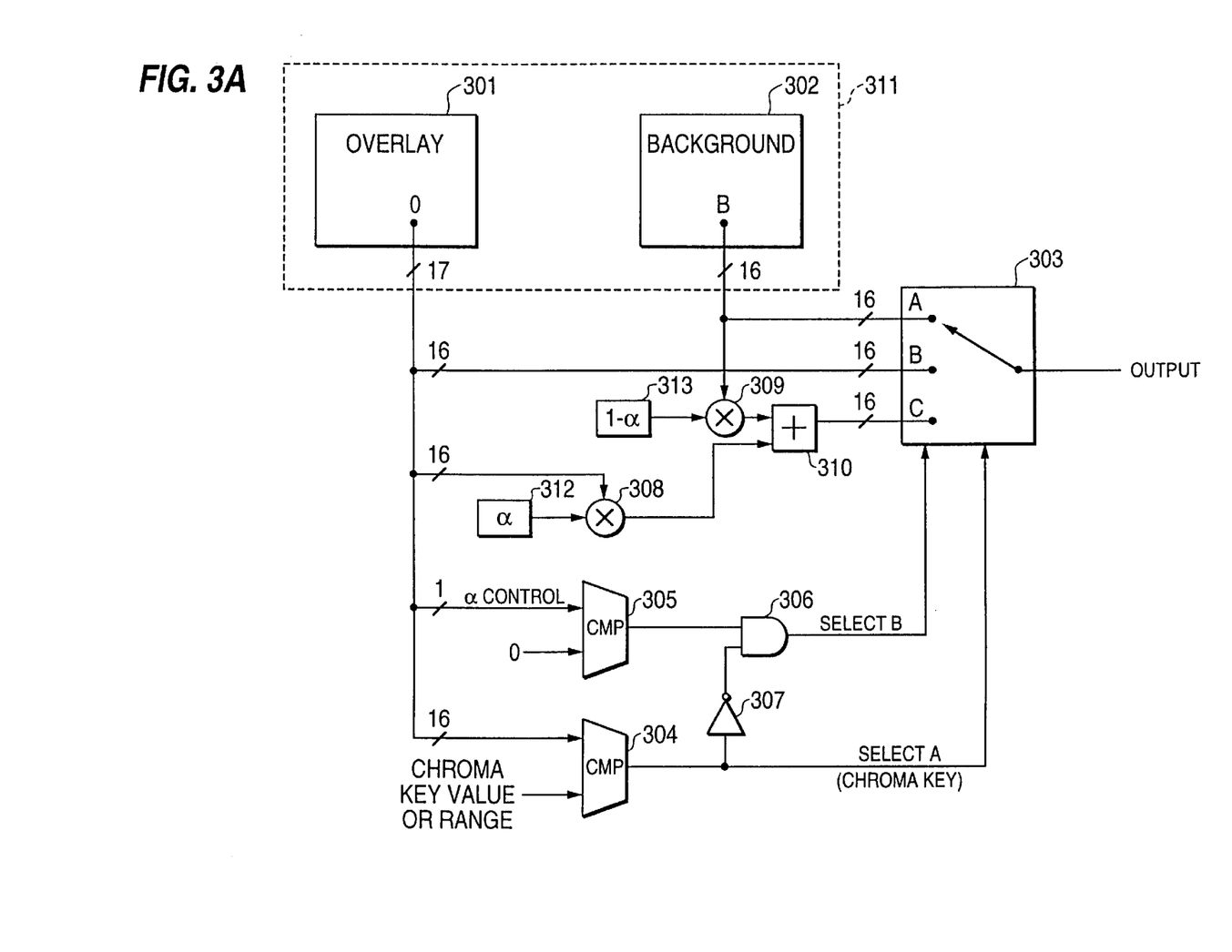
FIG. 3A shows one possible approach for using a chroma key function and alpha control bit to control the blending of pixel values in an overlay image and background image.

The chroma keying function and alpha control bit can be used to control logic circuitry in an application-specific integrated circuit or other type of device in order to blend pixels. FIG. 3A shows one possible approach for implementing the above principles.

As shown in FIG. 3A, a chroma key function is used to control whether a background pixel will be displayed transparently (i.e., no blending with the overlay occurs), or whether the overlay pixel will be displayed (whether blended with the background or opaquely on top of the background). Generally speaking, the overlay pixel value itself is compared to a chroma key value (or set of values). If the overlay pixel value matches or falls within a range established by the chroma key value(s), then only the background image is displayed (i.e., the overlay is completely transparent). However, if the overlay pixel value does not match or fall within a range specified by the chroma key value, the overlay pixel is either opaque (i.e., it is superimposed on the background image) or translucent (i.e., it is blended with the background pixel), depending on the alpha control bit for that pixel.

In FIG. 3A, an overlay image 301 and a background image 302 each comprise a plurality of pixels stored in a memory 311. For the purposes of explanation, it will be assumed that each pixel in overlay image 301 and in background image 302 comprises 16 bits of color value (5 red, 6 blue, 5 green). In addition, each pixel of the overlay image comprises an alpha control bit which is fed to comparator 305. A chroma key value or range of values (e.g., minimum/maximum) is fed to comparator 304 to be compared with the value of the overlay pixel, thus implementing the chroma key function. This established value or range may be set by an application program which controls the display. Based on the values of the alpha control bit and chroma key function, one of three possible switch settings (A, B, or C) will be made in selector 303 to determine the resulting output pixel value. It is assumed that if neither A nor B is selected, then position C will be selected, resulting in a blended pixel value.

The value of pixel O in overlay image 301 is compared with the chroma key value (or, alternatively, a range of values) and, if the comparison is favorable, switch setting A is selected, which results in all 16 bits of the background image being selected as the output. This is accomplished through the action of inverter 307 and AND gate 306, causing the output of the alpha control bit logic to be disabled when the chroma key function is activated. In other words, if the pixel value 0 in the overlay image matches the chroma key value in comparator 304, that overlay pixel is not displayed at all; only the corresponding background pixel B from image 302 will be displayed.

If the chroma key function is not activated (i.e., the comparison in comparator 304 is unfavorable), then the alpha control bit logic is enabled through the action of inverter 307 and AND gate 306. Accordingly, comparator 305 compares the value of the alpha control bit for overlay pixel O with zero and, if the alpha control bit is not set, a signal is produced to AND gate 306, which causes the B output of selector 303 to be activated. This causes all 16 bits of the overlay image to be directly output, without any blending with the background (i.e., the overlay pixel value is "opaque").

Finally, if the chroma key function is not activated and the alpha control bit is set, then AND gate 306 disables the A and B selections, and selector 303 switches by default to setting C, which selects a blended value of the overlay and background pixel values. The blending is accomplished by multiplying the alpha value α (312) by the overlay pixel value in multiplier 308, multiplying one minus the alpha value 313 by the background pixel value in multiplier 309, and adding the two products in adder 310. The blended result is output for display. Either or both of the alpha value 312 and one minus the alpha value may be stored in a register or other memory locations. Additionally, the functions of the circuitry shown in FIG. 3A may instead be implemented in a computer program or a programmed application-specific integrated circuit, for example.

As explained previously, the blending of pixel values is preferably performed separately for each red, blue and green component of an RGB color value. This is shown in FIG. 3C.

It is contemplated that an application programmer, who plans the layout of the resulting display, can set the chroma key function and alpha control bit for each pixel in the overlay. For example, one or more color values could be used to control the chroma keying function. Alternatively, these bits could be set in response to external stimuli, a random number generator, or any of various other ways to achieve special graphics effects.

Figure 3B:
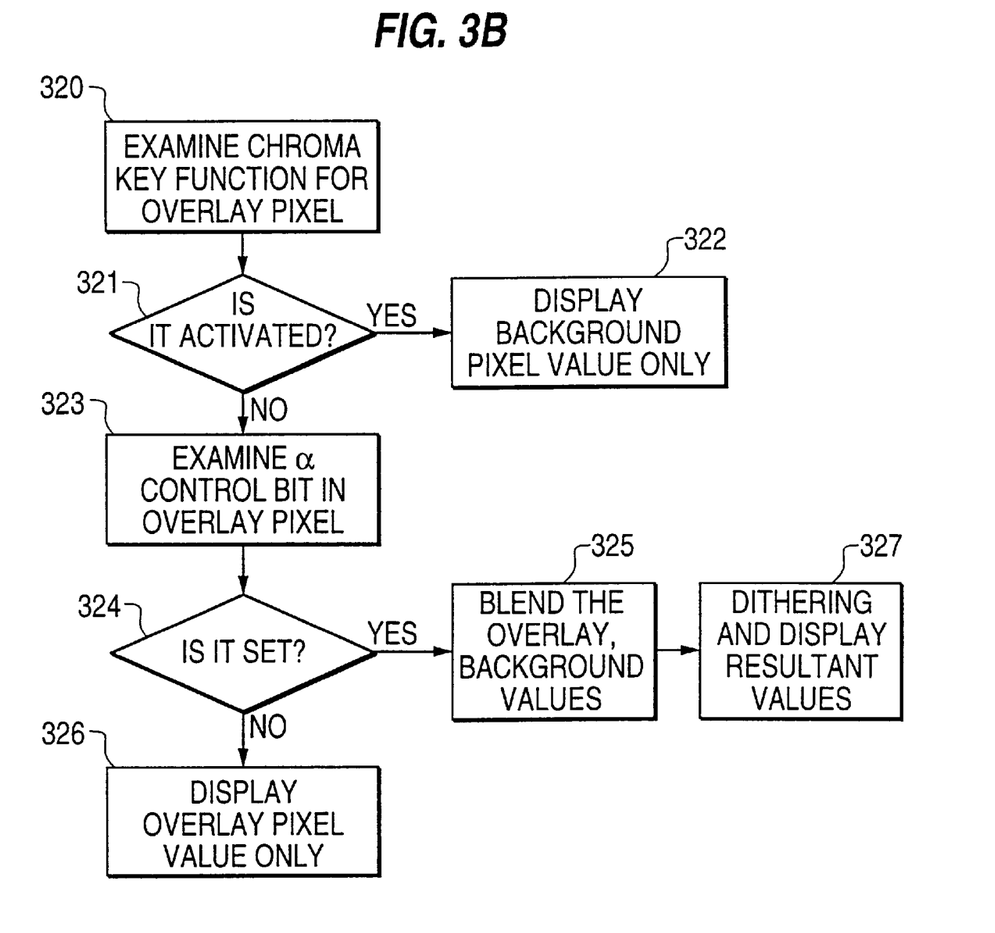
FIG. 3B shows steps of a method for using chroma keying and alpha control bits to control blending of overlay and background images.
Figure 3C:
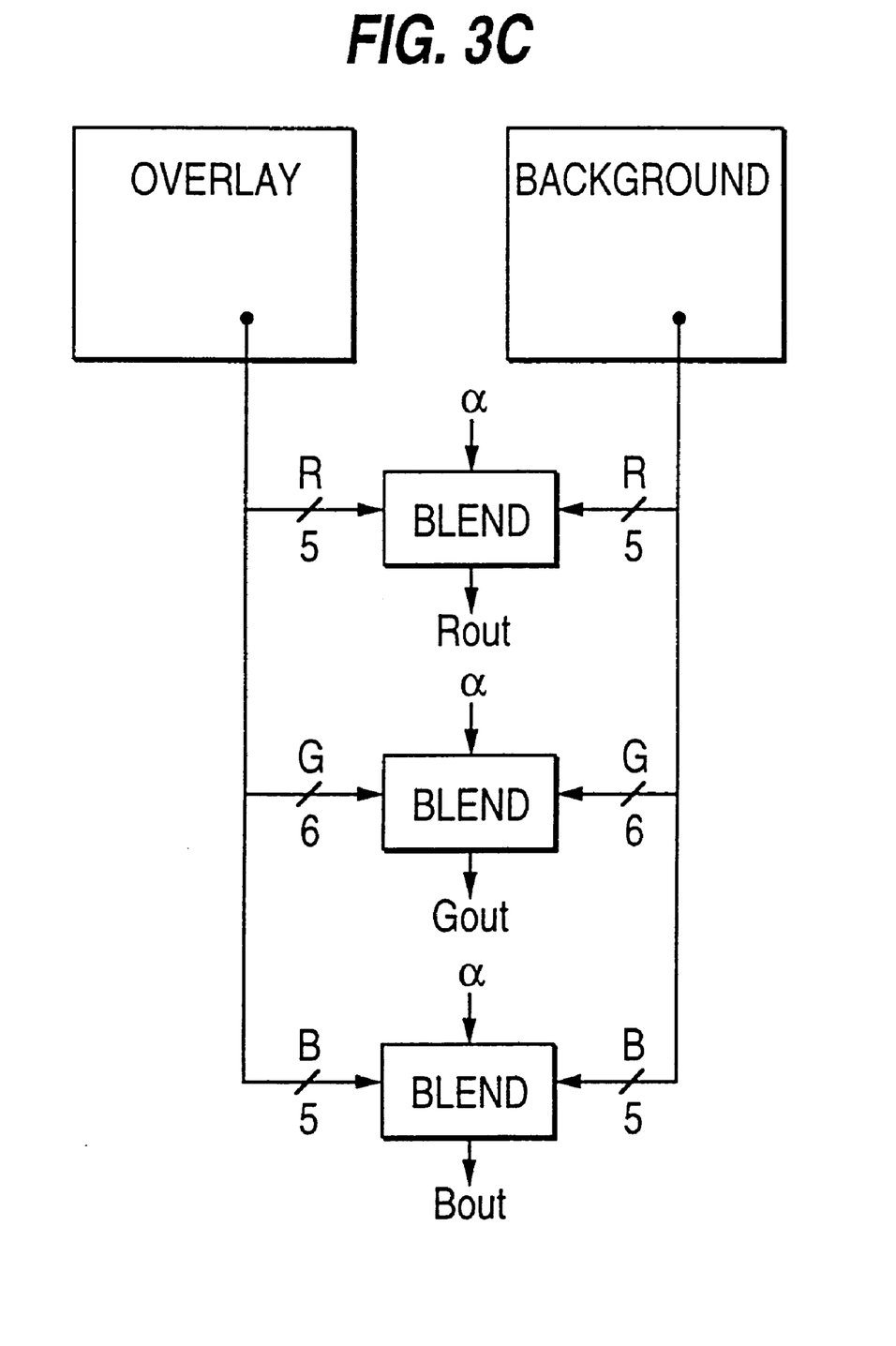
FIG. 3C shows how separate color components of each pixel in an overlay image and a corresponding background pixel may be separately blended.

FIG. 3B shows a flow chart for implementing a method according to various aspects of the invention. For each color component of each pixel which is to be displayed, the chroma key function for the particular overlay pixel value is examined (step 320). In step 321, if the chroma key function is activated, then in step 322 only the background pixel value is displayed for that pixel (i.e., the overlay pixel value plays no part in creating the resultant image).

Assuming that the chroma key function is not activated for that pixel, then in step 323 the alpha control bit associated with the overlay pixel is examined. If, in step 324, it is determined that the alpha control bit is set, then in step 325 the overlay pixel value is blended with the background pixel value using the previously described formula. Subsequently, the pixel can be dithered in step 327 (explained in more detail below) to soften the truncation of bits prior to being stored in memory (the dithering step can be delayed until other processing operations have been performed on the pixels). Generally, the dither process adds a dither signal to the 2 least significant bits of each of the red, green, and blue components of each pixel before the results are truncated to the desired word length.

Finally, if neither the chroma key function nor the alpha control bit are set, then in step 326 only the overlay pixel value is displayed; the background image value is ignored. This results in an opaque pixel value on the display screen.

Instead of using a chroma keying function, a separate bit can be associated with each overlay pixel value to indicate whether or not that overlay pixel will be displayed. Other combinations and variations are of course possible.

Figure 3D:
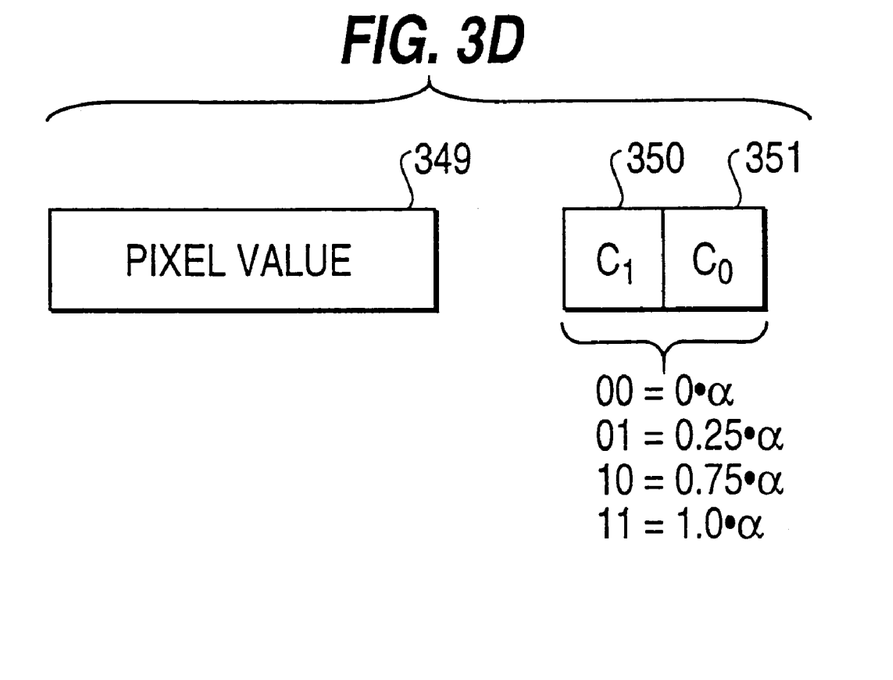
FIG. 3D shows one method of encoding multiple alpha control bits to refer to fractions of a predetermined alpha value.

Additional embodiments will now be described which contemplate associating more than one alpha control bit with each overlay pixel value, but which still result in significant memory savings beyond the conventional approach shown in FIG. 1B. As shown in FIG. 3D, each pixel value 349 may have associated therewith a plurality of alpha control bits 350 and 351 (denoted C1 and C0, respectively). By setting both bits to zero, a blending value of zero multiplied by the alpha value may be specified (i.e., only the background pixel will be displayed). By setting the bits to 01, a value of 0.25 (or any other predetermined value) multiplied by the alpha may be specified. By setting the bits to 10, a value of 0.75 (or any other predetermined value) multiplied by the alpha value may be specified. And by setting the bits to 11, a value of 1.0 (or any other predetermined value) multiplied by the alpha value may be specified.

Figure 3E:
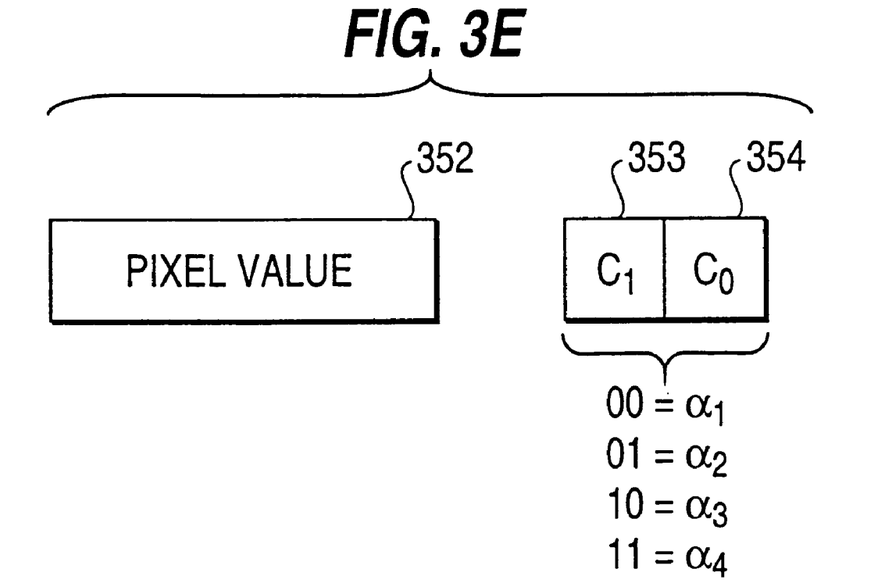
FIG. 3E shows one method of encoding multiple alpha control bits to refer to different predetermined alpha values.

Alternatively, as shown in FIG. 3E, alpha control bits 353 and 354 may be encoded to refer to different alpha values entirely, where each alpha value preferably comprises more bits than the bits used to encode them. Thus, for example, a value of 00 may refer to a first alpha blending value, a value of 01 may refer to a second alpha blending value, and so forth. Thus, a small number of alpha control bits can be used to "look up" a much larger alpha blending value or values, resulting in significant memory space savings.

Figure 3F:
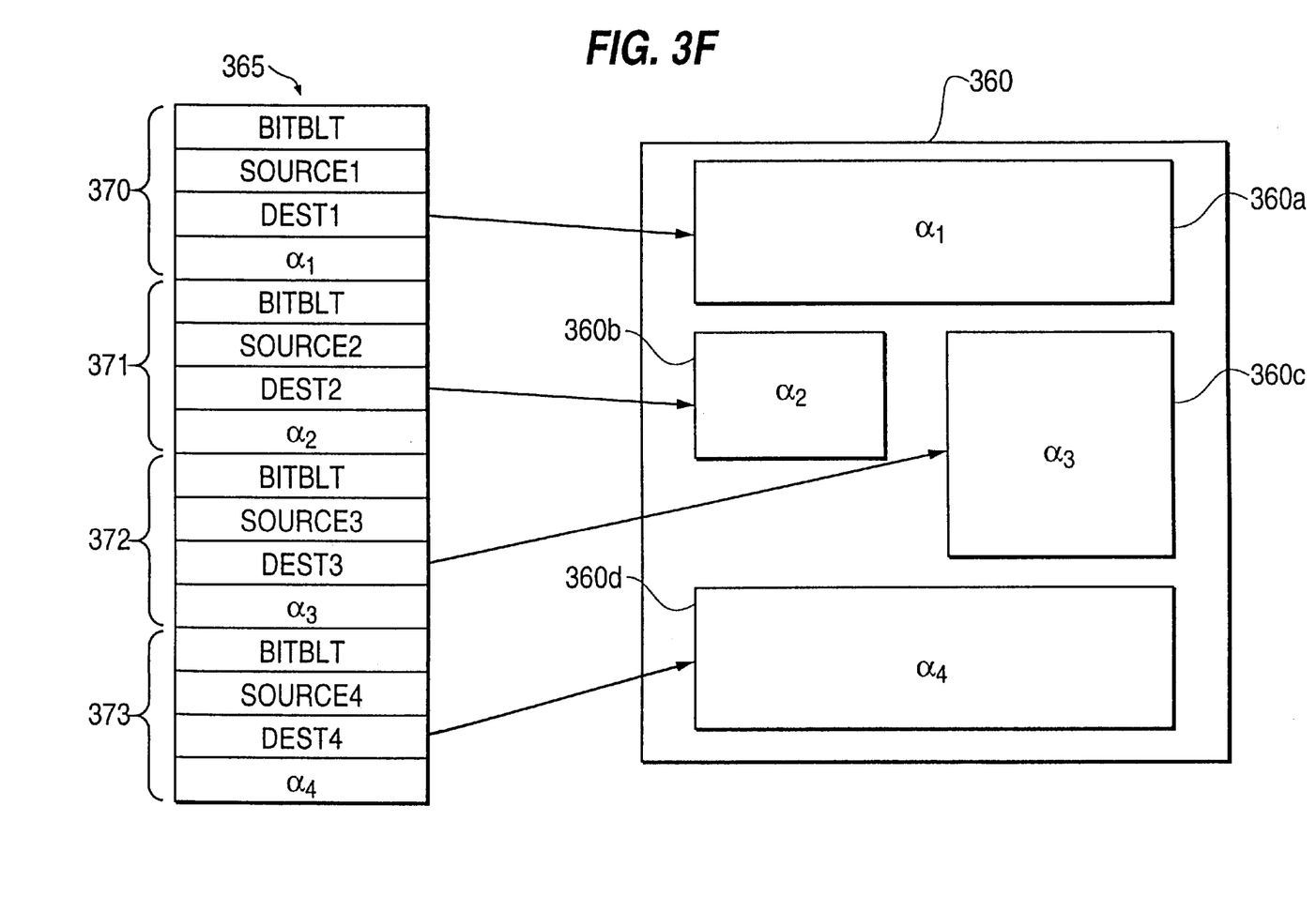
FIG. 3F shows how different alpha values can be associated with each element in a linked list of video operations corresponding to different image display areas in memory.

FIG. 3F shows how, in conjunction with the principles of the invention disclosed in copending application Ser. No. 08/612,104, entitled "List-Controlled Video Operations", incorporated by reference herein, different alpha blending values may be associated with each element of a linked list of video operations. As shown in FIG. 3F, a linked list of video operations 365 comprises four elements 370 through 373, each comprising parameters which specify a particular video operation to be performed in a video memory area 360 (the linking addresses are not specifically shown in FIG. 3F). Thus, element 370 comprises a bit block transfer operation (BITBLT) which specifies a source address SOURCE1, destination address DEST1, and a first alpha value α1. For all the pixels included in area 360a, a first alpha value α1 will be used to perform blending. Similarly, for all pixels included in area 360b, a second alpha value α2 will be used to perform blending, and so forth for areas 360c and 360d. Thus, different alpha blending values can be specified for different video display areas without requiring that 8 or 16 additional blending bits be associated with each overlay pixel value.

Figure 4:
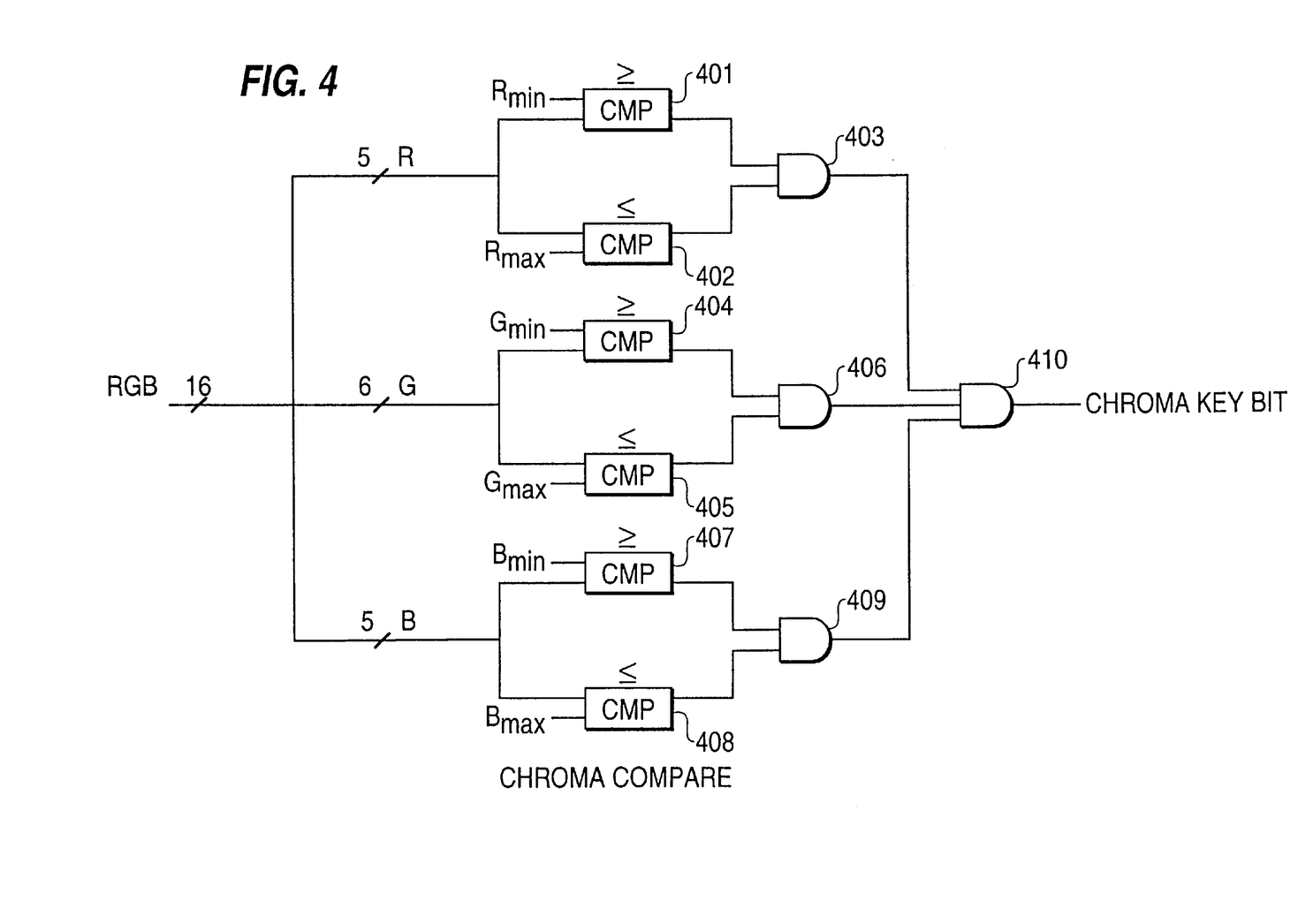
FIG. 4 shows a method of evaluating a chroma key by comparing an overlay pixel value to minimum and maximum values for each color component in accordance with a second embodiment of the invention.

FIG. 4 shows a technique for generating a chroma key function for each overlay pixel value in accordance with the above description. The chroma key function is determined by comparing the value of the overlay pixel to minimum and maximum values for each color component. Thus, the chroma key function implemented with comparator 304 of FIG. 3A can be performed using a circuit such as that shown in FIG. 4. An application program may designate a particular color, such as black, as being a "transparent" color, so that any overlay pixel value which takes on that value will cause the background image to be transparently displayed, thus ignoring the value of the overlay pixel. In other words, one or more colors in the overlay image itself can be used to control the transparency features of the invention.

As shown in FIG. 4, each overlay pixel value may be broken into its constituent color components (red, green, and blue bit groups) and compared to a chroma key value (which may also be broken into red, green, and blue components). If the overlay pixel value matches or falls within a range of values, the chroma key function is set and used to control the transparency of the background image as explained with reference to FIG. 3A and FIG. 3B. Thus, a single color in the overlay can be used as a "transparent" color, or a range of color values can be used as "transparent" colors. When using CLUT pixel types, only a single comparison needs to be made since there are no color components, and the circuitry in FIG. 4 is simplified.

In FIG. 4, each overlay pixel value is assumed to comprise 16 bits (5 red, 6 green, 5 blue), each color component of which is fed to one or more comparators (if a single color is designated as being transparent, only a single comparator needs to be provided for each component; if a range of colors is designated as being transparent, then two comparators may be used for each color component). The first comparators (401, 404, and 407) determine whether the input components are greater than or equal to minimum values (minimum red $R_{min}$, minimum green $G_{min}$, minimum blue $B_{min}$). The output of these comparisons are fed into AND gates 403, 406, and 409.

The second comparators (401, 404, and 407) determine whether the input components are less than or equal to maximum values (maximum red $R_{max}$, maximum green $G_{max}$, maximum blue $B_{max}$). The output of these comparisons are also fed into AND gates 403, 406, and 409. The output of these AND gates are fed into AND gate 410. Accordingly, only when all comparators are satisfied will the chroma key function be set to indicate that a particular overlay pixel is transparent. Instead of providing a range of pixel color values, the maximum and minimum values may be constrained so as to only be sensitive to a single color (for example, only pure black or only pure white).

Figure 5:
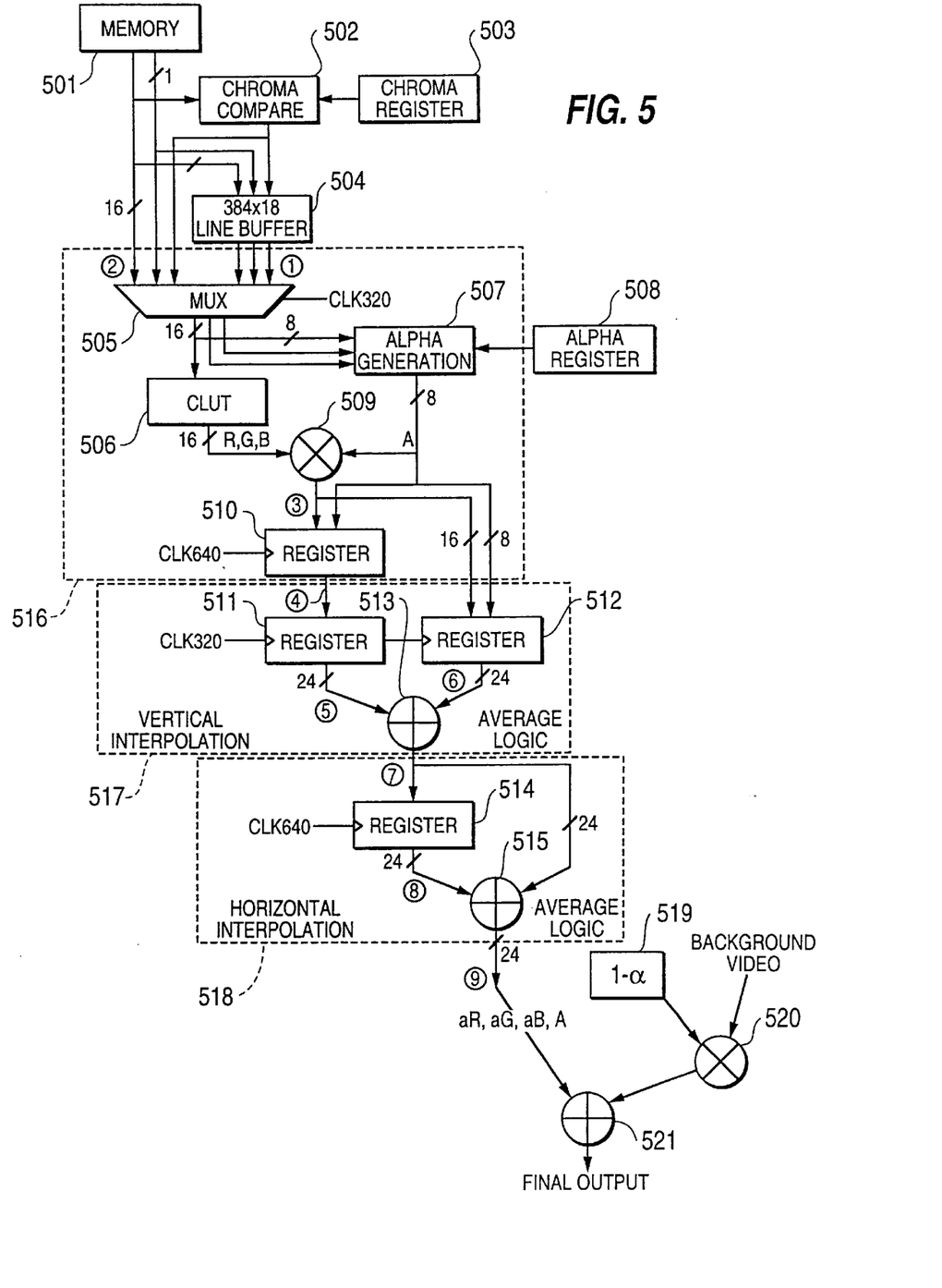
FIG. 5 shows one possible design for performing video blending operations including chroma keying and alpha blending.

FIG. 5 shows one possible design for implementing chroma keying, alpha blending, and other video operations in an efficient manner. The circuit of FIG. 5 can be programmed to operate in either RGB or CLUT modes, so that substantially the same circuitry can be used for both pixel types. The design shown in FIG. 5 can be implemented using an application-specific integrated circuit (ASIC) to enhance performance and minimize the number of parts. Additionally, although it is contemplated that a single alpha control bit is used for each overlay pixel, a plurality of alpha blending bits can of course be used, at the expense of added memory. FIG. 5 also shows how pixels can be interpolated to increase the resolution of a display image from a low or medium resolution display size.

Overlay pixels may be stored in any of various formats in memory. For example, the following three pixel formats may be used:

(1) RGB16: each pixel value comprises 16 bits, coded as 5 bits for red, 6 bits for green, and 5 bits for blue.

(2) CLUT8: each pixel value comprises 8 bits, and serves as an index into a color look-up table, whose entries consist of RGB values. Note that interpolation in CLUT8 mode is performed in the RGB domain, after performing the color look-up operation.

(3) ACLUT8: each pixel value comprises 8 bits, and further includes 8 bits of alpha blending value. When this mode is used, the one-bit alpha control bit is disabled. Its chroma keying (transparency, translucency or opacity) is determined solely by the alpha value encoded for each pixel. Any of various other formats are of course possible, and it is contemplated that the circuit of FIG. 5 could be used to operate in various modes depending on the pixel format and alpha blending value format.

As shown in FIG. 5, a memory 501 such as a DRAM may be used to store both the overlay and background images. When in RGB16 mode, for example, each pixel comprises 16 bits split into the three color components, whereas in CLUT8 mode, for example, each pixel value comprises 8 bits which are mapped to RGB values using a color look-up table CLUT 506 (in RGB modes, the CLUT is bypassed).

Assuming that RGB16 mode is enabled and that a chroma key value has been defined, 16 bits of overlay pixel value are fed to MUX 505, line buffer 504 and chroma compare circuit 502. Chroma compare circuit 502 compares the overlay pixel value with a value (or range) stored in chroma register 503. If the overlay pixel value is transparent (i.e., the chroma comparison is favorable), then blending of the overlay and background video are disabled, and only the background video pixel is displayed (i.e., the overlay pixel is ignored).

If the chroma comparison is unfavorable (i.e., the overlay pixel is not transparent), then the alpha control bit is fed through MUX 505 to alpha generation circuit 507, along with the alpha value from alpha register 508. Alpha generation circuit 507 checks to see whether the alpha control bit is set. If the alpha control bit is set, then the overlay pixel is pre-multiplied with alpha, causing blending to occur. If the alpha control bit is not set, then only the overlay pixel is displayed (i.e., the overlay pixel is "opaque").

When operating in CLUT8 mode (i.e., 8 bits per pixel), 8 additional bits can be allocated as an alpha blending value for each pixel. Thus, instead of a single alpha control bit, 8 bits of an alpha blending value can be used, and the transparency value (opaque, transparent, or translucent) can be determined solely by the alpha value encoded for each pixel. Accordingly, any alpha value in alpha register 508 is ignored, and the 8 bits of each overlay pixel are blended using that pixel's 8 bits of alpha blending value.

In conjunction with the blending operation, pixels may be interpolated vertically and horizontally in circuits 517 and 518, respectively. Additionally, when associating alpha blending bits with each pixel, the alpha values of two interpolated pixels may themselves be interpolated. The details of such interpolation are described in copending application Ser. No. 08/612,105, entitled "Interpolation of Pixel Values and Alpha Values in a Computer Graphics Display Device", incorporated by reference herein.

Blending may occur in stages, one of which is before interpolation and one of which is after interpolation; i.e., the original pixel is pre-multiplied by alpha before interpolation, then the pixels and the alpha value are interpolated, and then the result is blended with the background video by multiplying the background by (1-α) and adding the result to the interpolated foreground. As shown in FIG. 5, background video pixels are fed to a multiplier 520 which multiplies the pixel by (1-α). The result is fed to an adder 521, which causes the background pixel to be added to the overlay pixel. Blending could instead be performed after interpolation, or it could be performed in various other ways which will be readily apparent to those of ordinary skill in the art.

Figure 6:
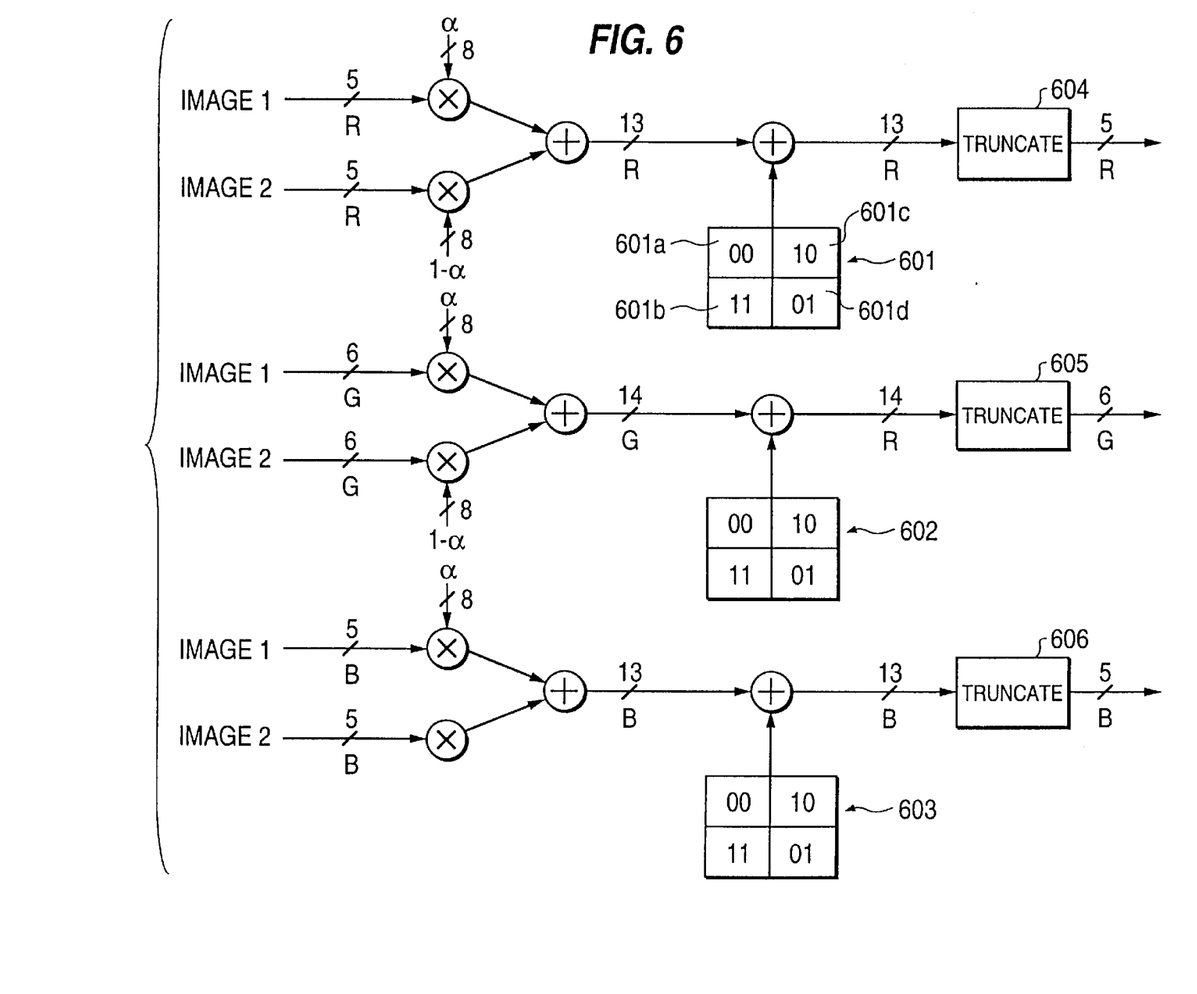
FIG. 6 shows how a dithering function can be added to the blending operations.

FIG. 6 shows a process for dithering pixel values which have been blended using an alpha value in accordance with various embodiments of the invention. In general, the process of blending a first pixel value with a second pixel value using an alpha value results in an increase in the number of bits for each pixel. For example, as shown in FIG. 6, when RGB16 pixels are used (5 red, 6 green, 5 blue), multiplying each group of 5 red pixels from a first image by an 8-bit alpha value, multiplying each group of 5 red pixels from a second image by an 8-bit value of one minus alpha, and adding the two results in 13 bits of significant digits. A similar problem occurs when the green and blue color components are blended. Thus, what started out as 16 pixels of an image (5,6,5) grows to 40 bits (13, 14, 13). Because the final image may generally only be allocated 16 bits, the 40 bits need to be truncated to 16 bits. However, truncating to 16 bits can cause "rough" edges in the resulting image, causing reduced quality.

In accordance with various aspects of the invention, a dithering function may be added after the alpha blending operations in order to enhance the quality of the resulting image. The dithering function may comprise a 2×2 matrix such as dither pattern 601, for example. This dither pattern may be replicated across the entire image, such that the dither value 601a is added to a pixel located at (0,0); the value 601b is added to a pixel located at (1,0); the value 601c is added to a pixel located at (0,1); and the value 601d is added to a pixel located at (1,1). This process can be repeated across all the pixels in the image, for each color component as shown in FIG. 6. The values in each dither pattern can of course be varied; the example shown in FIG. 6 is representative only.

After dithering bits are added, a truncation operation 604 through 606 is performed which truncates the least significant bits, resulting in an output having the desired number of bits. The effect of this dithering is similar to a "rounding" operation, resulting in a smoother output image.

Figure 7:
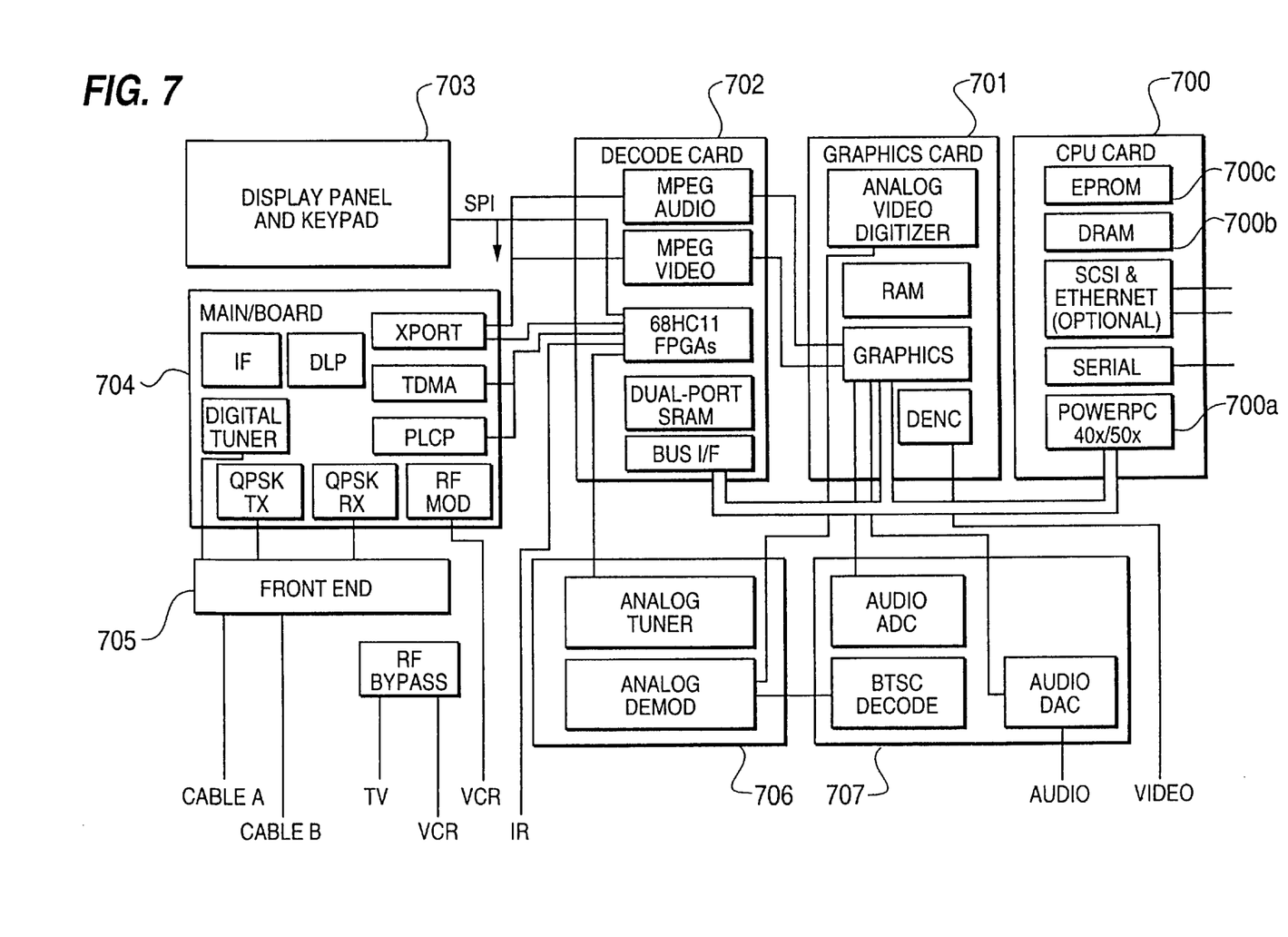
FIG. 7 shows one possible configuration for a home communication terminal (HCT) in which the graphical processing system of the present invention can be installed.

FIG. 7 shows a block diagram of a home communication terminal (HCT) in which various principles of the present invention may be practiced. The HCT may include a CPU card 700, graphics card 701, decoder card 702, display panel and key pad 703, main processing board 704, front end 705, tuning section 706, and audio section 707. It is also contemplated that application programs executing on CPU 700a can interact with various peripherals such as a mouse, game controllers, keypads, network interfaces, and the like, as is well known in the art. The various graphics functions described herein, including an ASIC implementation thereof, can be provided in graphics card 701.

It is apparent that many modifications and variations of the present invention are possible, and references to specific values are by example only. As one example, where reference is made to bits being "set", it is self-evident that a bit value of either zero or one could accomplish the "setting" of that bit. It is, therefore, to be understood that within the scope of the appended claims the invention may be practiced otherwise than as specifically described.

We claim:

1. Apparatus for blending a first image comprising a first plurality of pixels with a second image comprising a second plurality of pixels, each of the first plurality of pixels comprising a displayable pixel value and an alpha control bit which controls the blending of the displayable pixel value with a corresponding displayable pixel value from the second image, the apparatus comprising:
   a memory for storing the first image;
   a line buffer for storing a line of pixels of the first image read from the memory;
   a multiplexer having a first input for receiving a line of pixels from the memory, a second input for receiving a line of pixels from the line buffer, and an output which alternates between the first and second inputs in accordance with a clock signal;
   an alpha generation circuit, responsive to each alpha control bit in the first image which is output from the multiplexer, for outputting a stored alpha value α comprising a plurality of bits;
   an alpha multiplier for multiplying the alpha value output by the alpha generation circuit with one of the displayable pixel values in the first image; and
   a chroma comparison circuit which compares each displayable pixel value in the first image with a stored chroma value and, responsive to a determination that the displayable pixel value matches the stored chroma value, prevents the stored alpha value from being multiplied with the displayable pixel value of the pixel in the first image.

2. The apparatus of claim 1, further comprising a color look-up table, coupled to the output of the alpha multiplier, for looking up a red-green-blue color value for the displayable pixel value prior to being multiplied by the multiplier.

3. The apparatus of claim 1, further comprising blending means for multiplying each displayable pixel value in the second image with the quantity (1−α) and adding the result to an output of the alpha multiplier.

4. The apparatus of claim 3, further comprising an interpolation circuit, coupled between the alpha multiplier and the blending means, for interpolating pixel values prior to performing the multiplication with the quantity (1−α).

5. The apparatus of claim 1, wherein each pixel in the first image comprises a plurality of alpha control bits, and wherein the alpha generation circuit outputs a different alpha value for each permutation of the alpha control bits.

6. Apparatus for blending a first image comprising a first plurality of pixels with a second image comprising a second plurality of pixels, each of the first plurality of pixels having associated therewith a chroma key function indicating whether the pixel is completely transparent, an alpha control bit indicating whether the pixel should be blended, and remaining bits constituting a pixel value, the apparatus comprising:
   means for determining whether the chroma key function for each pixel in the first image is activated and, responsive to such determination, causing a corresponding pixel value from the second image to be output as a result with no component from the first image;
   means for determining whether the alpha control bit for each pixel in the first image equals a second fixed value and, responsive to such determination, causing the remaining pixel bits to be output as a result with no component from the second image, and otherwise blending the remaining pixel bits with a corresponding pixel value from the second image in accordance with a stored alpha value.

7. The apparatus of claim 6, wherein the first image comprises an overlay image generated by an application program and the second image comprises a live video image.

8. The apparatus of claim 6, wherein the blending is performed by multiplying the remaining pixel bits with the stored alpha value, multiplying the corresponding pixel value from the second image by one minus the alpha value, and adding the results thereof.

9. The apparatus of claim 6, wherein a plurality of alpha control bits are set around the edge of an object depicted in the first image, resulting in a smoothing effect near the edges of the object.

10. The apparatus of claim 6, wherein the means for determining whether the chroma key function for each pixel in the first image is activated comprises means for determining whether the pixel value falls within a range of predetermined chroma values.

11. A method for blending a first image comprising a first plurality of pixels with a second image comprising a second plurality of pixels, each of the first plurality of pixels having associated therewith a chroma key function indicating whether the pixel is completely transparent, an alpha control bit indicating whether the pixel should be blended, and remaining bits constituting a pixel value, the method comprising the steps of:
   (1) determining whether the chroma key function for each pixel in the first image is activated and, responsive to such determination, causing a corresponding pixel value from the second image to be output as a result with no component from the first image;
   (2) determining whether the alpha control bit for each pixel in the first image equals a second fixed value and, responsive to such determination, causing the remaining pixel bits to be output as a result with no component from the second image; and (3) for each pixel in the first image for which the determination in step (2) was not made, blending the remaining pixel bits with a corresponding pixel value from the second image in accordance with a stored alpha value.

12. The method of claim 11, wherein step (3) comprises the steps of:
   (a) multiplying the remaining pixel bits with the stored alpha value;
   (b) multiplying the corresponding pixel value from the second image by one minus the alpha value; and
   (c) adding the results of steps (a) and (b).

13. The method of claim 11, further comprising the step of dithering each pixel resulting from the blending operation using a dithering pattern.

* * * * *